Sept. 17, 1957   J. M. JOHNSON   2,806,615
DOLLY FOR HANDLING SINGLE AND DUAL TRUCK WHEELS
Filed Nov. 25, 1953   3 Sheets-Sheet 1
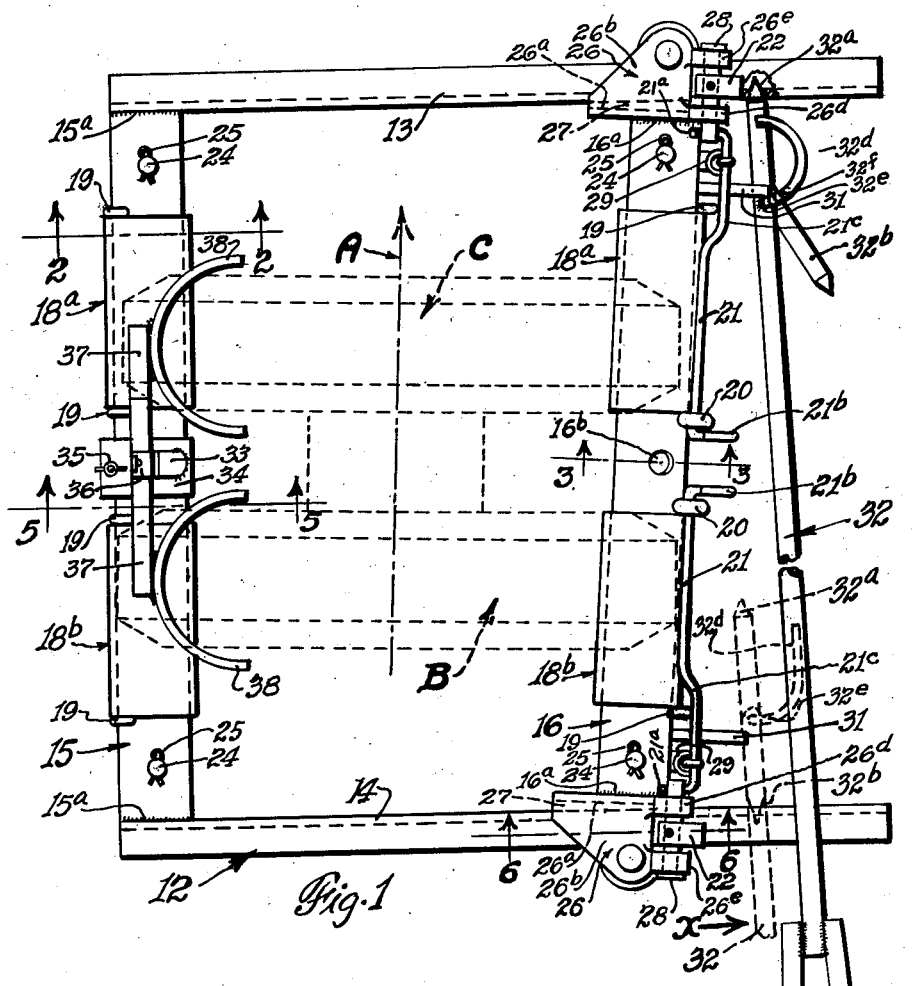
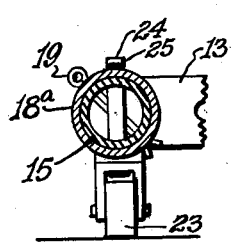
Fig. 2
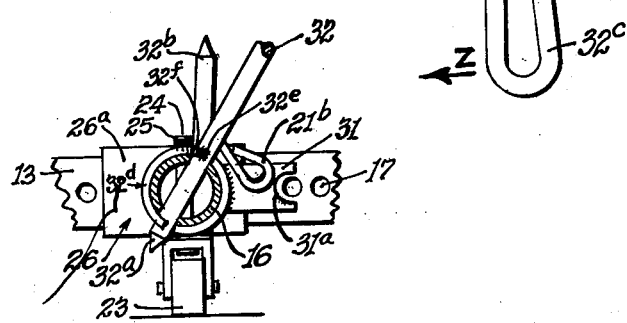
Fig. 3
INVENTOR.
John Melvin Johnson
BY Frank J. Schraeder Jr.
Attorney

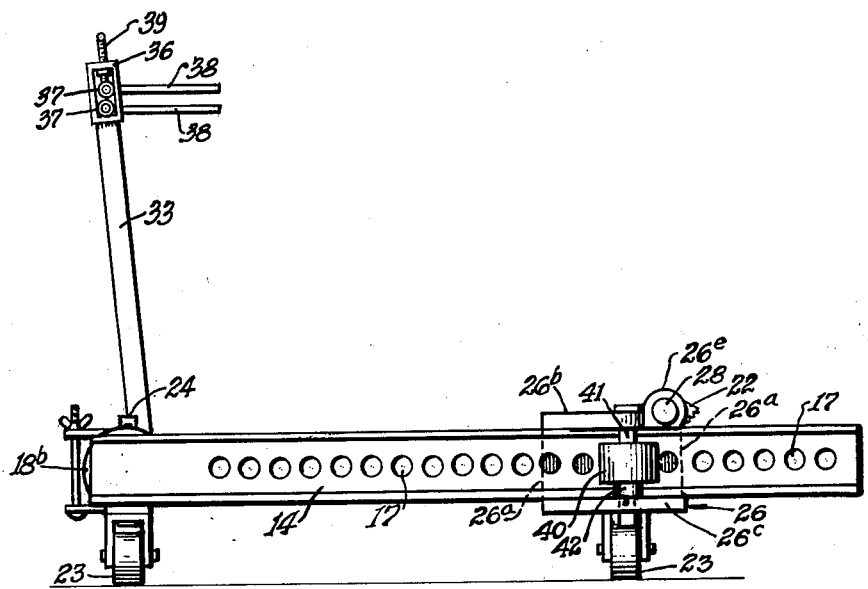
Fig. 4
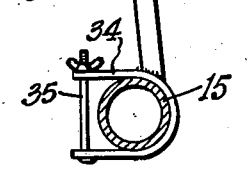
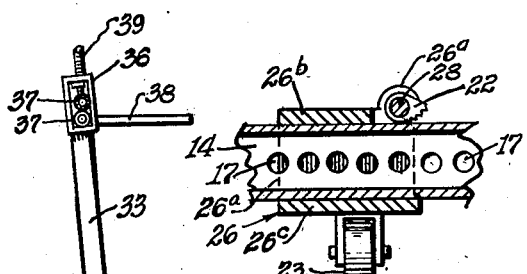
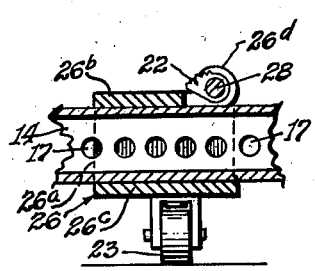
Fig. 5  Fig. 6  Fig. 7
INVENTOR.
John Melvin Johnson
BY Frank Schraeder
Attorney

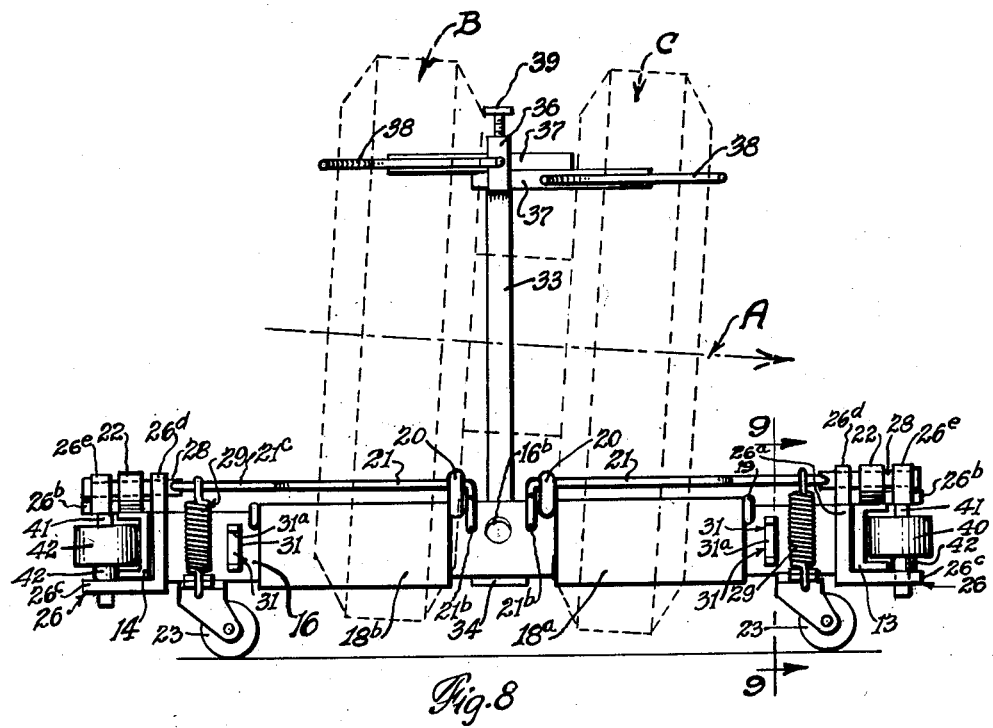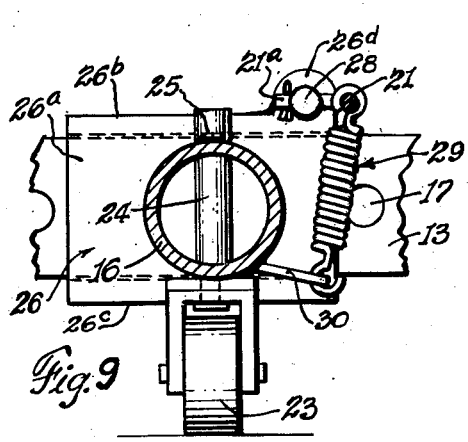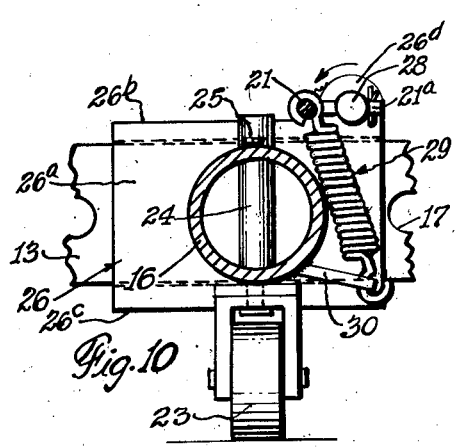

United States Patent Office 2,806,615
Patented Sept. 17, 1957

2,806,615

DOLLY FOR HANDLING SINGLE AND DUAL TRUCK WHEELS

John Melvin Johnson, Lindsborg, Kans.

Application November 25, 1953, Serial No. 394,239

4 Claims. (Cl. 214—333)

This invention relates to a new, useful and improved dolly for facilitating the removal and replacement of heavy single or dual wheels respectively from and onto the axle of a service vehicle such as a motor truck, motor bus or a farm or industrial tractor; such wheels being commonly equipped with large and comparatively heavy pneumatic tires which render same cumbersome and exceedingly difficult to handle.

One of the objects of my invention is to provide a simple and durable dolly which will materially aid a service worker in the handling of heavy vehicle wheels when removing and replacing same during servicing operations such as grease-packing bearings, replacing grease seals, repairing tires, and servicing brakes; the accomplishment of such servicing operations being performed with comparatively greatly reduced physical effort and with a saving of considerable time.

An object of the invention is to provide a dolly which can be fabricated from comparatively light-weight structural plate and angle iron material at low cost.

Another object of the invention is to provide a wheel dolly which may be adjusted to accommodate wheels differing in size.

Another object of the invention is to provide a wheel dolly which may be adjusted to raise and support a single or dual wheel in vertical or in slightly inclined position depending upon the horizontal or slightly angularly disposed axis of the wheel axle when in elevated position prior to the servicing of one or more of the wheels on that axle.

The various features of novelty whereby the present invention is characterized will hereinafter be pointed out with particularity in the claims, but, for a full understanding of the invention and of its objects and advantages, reference may be had to the following detailed description taken in connection with the accompanying drawings.

In the accompanying drawings:

Fig. 1 is a plan view of a wheel servicing dolly embodying my invention;

Fig. 2 is a cross-section of the stationary one of the wheel-lifting members taken on line 2—2 of Fig. 1;

Fig. 3 is a cross-section of the movable one of the wheel-lifting members taken on line 3—3 of Fig. 1 showing a lower portion of a combined handle and pinch bar inserted into an aperture in the wheel-lifting member for towing the dolly;

Fig. 4 is a side elevation of the dolly shown in Fig. 1;

Fig. 5 is a cross-section taken on line 5—5 of Fig. 1 showing my improved wheel holder mounted on the dolly;

Fig. 6 is a cross-section taken on line 6—6 of Fig. 1 showing a section through one of the U-shaped slidable supports at one end of the movable wheel-lifting members and also showing one of the serrated retaining cams in engagement with one of the side rails;

Fig. 7 is a cross-section similar to that shown in Fig. 6 but showing the one retaining cam in released position;

Fig. 8 is an end elevation of the dolly looking at the dolly from the open end of its U-shaped frame;

Fig. 9 is an enlarged cross-section taken on line 9—9 of Fig. 8 showing one of the springs that tend to keep the retaining cams in positions engaged with the side rails; and Fig. 10 is an enlarged cross-section similar to that shown in Fig. 9 but showing the position of the spring when its coacting retaining cam is in released position.

The preferred embodiment of the dolly, as illustrated in the accompanying drawings, comprises a U-shaped rigid frame generally designated by numeral 12 and consisting of a pair of laterally spaced parallelly aligned side rails 13 and 14 transversely rigidly connected together at corresponding ends by what may conveniently be termed the stationary one of the wheel-lifting members designated by numeral 15.

The dolly 12 is also provided with a cooperating wheel-lifting member generally designated by numeral 16. These elongated wheel-lifting members 15 and 16 may be made of steel of any suitable structure, preferably, of light-weight tubular steel of circular cross-section as shown in Figs. 2, 3, 9 and 10.

The side rails 13 and 14 are preferably channel-shaped elongated members provided with a plurality of circular openings 17 in the webs thereof spaced longitudinally of the webs and functioning to lighten the weight of the dolly and also providing means for engagement therein of the end of a pinch bar employed for shifting the slidably movable wheel-lifting member 16 toward and from the stationary member 15.

Both of the wheel-lifting members 15 and 16 are each provided with a pair of cylindrical sleeve-like rollers $18^a$ and $18^b$ rotatably supported thereon in spaced apart positions on the medial portions thereof.

To prevent longitudinal sliding movements of the rollers $18^a$ and $18^b$ that are rotatably mounted on the stationary member 15, I provide any suitable means such as, for example, a cotter pin 19, at each end of the roller, that extends through the member 15.

To likewise prevent longitudinal shifting of the rollers $18^a$ and $18^b$ on the movable member 16, I provide, at the outer ends of the rollers similar retaining cotter pins 19, however, the inner ends of the rollers on this movable member 16 are retained by substantially larger cotter pins 20 which also function as supports for the rods 21 that actuate the retaining cams 22 as will be more fully explained.

The frame of the dolly consisting of the members 13, 14, 15 and 16 is supported on caster wheels 23 carried on yoked spindles 24 that extend upwardly through the members 15 and 16 and are removably secured at their upper ends by cotter pins 25.

The stationary wheel-lifting member 15 is rigidly secured at its ends to the back faces of the webs of the channel rails 13 and 14, as by welding designated by $15^a$.

The movable wheel-lifting member 16 is slightly shorter than its companion member 15 to allow spaces at its ends for the brackets 26 to which it is welded as at $16^a$. The member 16 is slidably carried on the brackets 26 and each bracket 26 is of cast iron and of U-shape form consisting of a vertical back or web $26^a$ and vertically spaced laterally extending flanges $26^b$ and $26^c$ cast integrally with the web $26^a$.

In certain wheel-lifting operations such as when the vehicle axle is jacked-up at one end near the wheel to be serviced, the tilted axis of the wheels being lifted by the cooperating wheel-lifting members 15 and 16 will necessitate and be facilitated when the movable member 16 is shifted at a slight angle relatively to the stationary member 15 and, therefore, I provide adequate clearance spaces between the inner faces of the webs $26^a$ and the back faces of the webs of the rails 13 and 14 as more clearly shown by numeral 27 in Fig. 1.

The brackets 26 are each provided with a pair of laterally spaced ears $26^d$ and $26^e$ formed integrally with and along the outer edge of the upper flange $26^b$.

Extending through each pair of ears $26^d$ and $26^e$ is a short rotatable shaft 28 to which is securely keyed, between the ears, a serrated cam 22.

Each cam 22 is adapted to be rotated a portion of a complete rotation into and out of operative engagement with one of the rails by its serrated cammed face by means of a rod 21 having one end 21a extended angularly into connection with the outer end of shaft 28; the opposite end of the rod 21 being bent to form a handle 21b with the adjacent portion of that end of the rod extending through the eye of the head of cotter pin 20 for rotatable support therein.

To releasably retain the cams 22 in operatively engaged and disengaged positions, I provide each cam-operating rod 21 with a coiled spring 29 having one end hooked around the rod 21 and its opposite end hooked to a short bar 30 welded at its inner end to the member 16. As shown in Figs. 1, 6 and 9, the spring 29 is shown in position when the retaining cam 22 is in frictional engagement with the upper face of the rail 13 with the handle 21b in lowered position as illustrated in Figs. 1, 3 and 8.

As shown in Figs. 7 and 10, the cam-position-retaining spring 29 is shown in the position when the handle 21b is raised to thereby rotate the cam 22 into released position.

To impart to the springs 29 their resilient retainment of the cams in either engaged or disengaged positions, the outer end portions 21c of the rods 21 are bent to offset same axially relatively to the longitudinal axes of the inner portions thereof thereby imparting short crank-arm effects to the portions 21c of the rods to which the upper ends of the spring 29 are connected, as more clearly shown in Fig. 1.

Secured to the outer side of member 16 and a spaced distance from its ends are abutments 31 each consisting of a comparatively short plate extending laterally from and right-angularly to the member 16, welded to the member 16, and provided with recessed seats 31a within their outer edges preferably semi-circular in shape, as more clearly shown in Fig. 3.

Operation of the dolly

In Figs. 1 and 8 the letter A designates the center-line of the vehicle axle on which the dual set of wheels B and C, shown in broken lines, is mounted. The arrow at one end of the center-line A points toward the center of the vehicle.

To remove the dual set of wheels B and C from the vehicle axle for servicing, that end of the axle is first raised by any suitable jack placed under the axle near the wheels to be serviced and when so raised the axis of the wheels will assume a slightly angular position about, for example, as illustrated in Fig. 8 and those wheels will thus be lifted off the floor.

Before the dolly is placed under the elevated wheels B and C, the completely assembled wheel-lifting unit 16 is slidably removed from its supporting rails 13 and 14 and the U-shaped frame is then rolled on its wheels 23 in a direction from left to right as viewed in Fig. 1, until the U-shaped frame occupies the position shown in Fig. 1 wherein such position the rail 13 extends inwardly of the inner side of wheel C and the rail 14 extends outwardly of the outer side of the outer wheel B and the rollers 18a and 18b of the relatively stationary unit 15 are positioned close to or in contact with the tires of the wheels B and C. Having thus positioned the U-shaped frame under the wheels, the wheel-lifting unit 16 is then slidably remounted upon the rails 13 and 14 by sliding movement on its brackets 26 until its rollers 18a and 18b are brought into contact with the corresponding sides of the wheel tires. In such position of the dolly, as shown in Fig. 1, the wheels B and C are embraced by and between the pairs of rollers 18a and 18b of the wheel-lifting units 15 and 16 but as yet are not supported on the dolly.

In the use of the dolly to remove the wheels B and C from the axle spindle for servicing the tires, or for servicing the spindle or its bearings or seal, the vehicle wheels must be slightly lifted by the cooperating pairs of dolly rollers 18a and 18b to thereby transfer at least a portion of the weight of the dual wheels to the dolly and this is accomplished by alternately inserting the prong ends 32a and 32b alternately into holes 17 of the rails 13 and 14 while the pinch bar is braced against one of the abutments 31 and alternately moved at its free end 32c in the direction of arrow Z and then in the direction of arrow X, as illustrated in Fig. 1, thereby alternatively shifting, by the lever action of the bar 32, the opposite ends of the unit 16 and its rollers 18a and 18b toward their corresponding rollers 18a and 18b on the member 15 and thereby forcibly raising the wheels B and C by the wedging action of the rollers to thus support the vehicle wheels on the dolly.

To permit alternate shifting of the opposite ends of the movable wheel-lifting unit 16 by the use of the pinch bar 32 from the front end of the dolly, as illustrated in Fig. 1, the pinch bar 32 consists of an elongated bar terminating in an axially aligned pointed prong end 32a and an additional integral pointed prong 32b extending angularly thereto and extending inwardly at an acute angle. The alternate use of the prongs 32a and 32b is illustrated in Fig. 1 by respectively full lines and by broken lines; the two positions of the bar 32 show same after having shifted the ends of the unit 16.

During the shifting movements of the wheel-lifting unit 16 into the above-described wheel-lifted position, the handles 21b of the cam operating rods 21 are pushed down, as shown in Fig. 3, so that the cams 22 engage the top faces of the rails 13 and 14 with their serrated faces thus permitting the unit 16 to slide toward the wheels B and C to lift same but by the frictional resistance of the serrations on their cammed faces preventing the unit from reverse sliding movement. This engaged position of the cams, as illustrated in Figs. 6 and 9, is maintained by the springs 29.

The dolly is also provided with means for retaining the wheels B and C on the dolly during towing of the wheels thereon; such retaining means consisting of an upright post 33 welded at its bottom end to a U-shaped clamp 34 adapted to embrace the stationary tubular member 15 for rigid connection thereto by a tightening bolt 35. Welded to the top end of the post 33 is a rectangularly shaped yoke 36 adapted to embrace therein a pair of superposed elongated tubular supports 37 each having welded thereto a semi-circular holder 38 adapted to embrace one of the wheel tires. To accommodate varying axial spacing of the wheel tires, the tubular supports 37 are slidably axially adjustably supported in the yoke 36 and secured therein by a compression screw 39.

As indicated in the foregoing part of the specification, the pinch bar 32 may, if so desired also function as a handle for towing the dolly and, for such purpose, is provided with a substantially semi-circular arm 32d having one end welded to the bar 32, as at 32e and its opposite end free and spaced from the adjacent side of bar 32, more specifically stated, the semi-circular portion 32d is disposed in a plane spaced from the bar 32 but parallel thereto and with that portion of the semi-circular portion near the welded end curved inwardly, as at 32f, to meet within the weld at the side of the bar 32.

The curved portion 32d is formed on a radius to embrace the tubular member 16 when the prong 32a is inserted through the diametrically aligned openings 16b to thus couple the rod 32 to the dolly as a handle for towing the dolly. This towing connection between the rod 32 and the dolly is illustrated in Fig. 3.

As illustrated in Figs. 1 and 8, the dolly is shown in a dual-wheel lifting operation wherein the vehicle wheel axle has been jacked up adjacent to the wheels to be serviced so that the axis of the wheels designated by the center-line A is slightly tilted upwardly in a direction outwardly from the center of the vehicle, as clearly shown in Fig. 8, and in such tilted position, the outer wheel B is elevated slightly higher than the inner wheel C.

One of the important operational advantages in the design of the movable wheel-lifting unit 16 is its adaptability to manual shifting, as by the pinch bar 32, to such position wherein the longitudinal axis of this unit 16 is disposed angularly relatively to the axis of the stationary unit 15 as shown in Fig. 1; in such angular position, the pairs of rollers 18ª and 18ᵇ accommodate themselves to the tilted position of the vehicle axle and coact to lift both wheels B and C and to maintain the tilted angular position of the axis of the vehicle wheels which is important in both demounting and remounting of the wheels during their servicing as once the wheels B and C are removed from the axle spindle the cams 22 will maintain the unit 16 in its present angular position until these wheels are serviced and remounted on the axle spindle.

After the wheels B and C are remounted on the axle spindle, the movable unit 16 may be released from its engagement with the wheels B and C by rotating the cams 22 into released positions, as shown in Figs. 7 and 10, by simply raising the handles 21ᵇ to thereby rotate the cam-actuating shafts 28; such released positions of the cams being then retained by the coil springs 29 thus permitting the unit 16 to be slidably removed from the dolly frame and the frame thereafter rolled away from under the vehicle wheels.

To facilitate mounting and demounting of the movable unit 16, I provide guide rollers 40 disposed between the flanges of the rails 13 and 14 and rotatably carried on vertical pins 41 supported in the lateral flanges 26ᵇ and 26ᶜ of the castings 26. The rollers 40 being centered between the flanges of the rails 13 and 14 by any suitable means, as for example, by the washers 42 interposed between the lower lateral sides of the rollers 40 and the adjacent faces of the flanges 26ᶜ.

The rollers 40 are not necessary for the operation of the dolly, their primary function being that of lessening the tendency of binding between the castings 26 and the rails 13 and 14.

Obviously, those skilled in the art to which my invention appertains may make various changes in the details and arrangement of the parts without departing from the spirit and scope of the invention as defined by the claims hereto appended and, therefore, I do not wish to be restricted to the precise construction herein disclosed as illustrative of a preferred embodiment of my invention.

I claim:

1. A dolly of the kind described comprising a movable frame including a pair of laterally spaced parallelly aligned planar rails transversely rigidly connected together at corresponding portions by a relatively stationary wheel-lifting member, a first pair of wheel-engaging longitudinally spaced rollers rotatably supported on said stationary member, a movable wheel-lifting member having end-supporting brackets slidably carried on said rails, a second pair of wheel-engaging longitudinally spaced rollers rotatably supported on said movable member and laterally aligned with said first pair of wheel-engaging rollers, and manually actuable means for alternately slidably shifting the opposite ends of said movable member to thereby present said rollers at spaced portions of the periphery of a wheel whereby upon further slidable movement of said movable member toward said stationary member the wheel is lifted, by the cooperative wedging action of said rollers, for support on the dolly.

2. A wheel-lifting and transporting dolly comprising a movable frame including a pair of laterally spaced parallelly aligned rails transversely rigidly connected together at corresponding ends by a relatively stationary cylindrical wheel-lifting member, a first wheel-engaging cylindrical roller rotatably coaxially supported on said stationary member, a movable cylindrical wheel-lifting member slidably carried and shiftable on said rails, a second wheel-engaging cylindrical roller rotatably coaxially supported on said movable member and laterally aligned with said first wheel-engaging roller, brackets on the ends of said movable wheel-lifting member mounted for sliding movement on said rails, a shaft rotatably mounted on each of said brackets, a serrated cam secured to each of said shafts, means for partially rotating said shafts to cause said cams to frictionally engage or disengage said cams respectively with or from said rails, resilient means carried on said movable member operatively associated with said shafts adapted to releasably maintain said cams in positions either engaged with or disengaged from said rails, and manually actuable means for slidably shifting said movable member on said rails to cause said rollers to engage and lift the wheel for support on the dolly by a wedging action of said rollers, said movable member being adapted to be slidably shifted to position its longitudinal axis either parallelly or slightly angularly relatively to the longitudinal axis of said stationary member.

3. A wheel-lifting and transporting dolly comprising a movable frame including a pair of laterally spaced parallelly aligned rails transversely rigidly connected together at corresponding ends by a relatively stationary cylindrical wheel-lifting member, a first wheel-engaging cylindrical roller rotatably coaxially supported on said stationary member, a movable cylindrical wheel-lifting member slidably carried on said rails, a second wheel-engaging cylindrical roller rotatably coaxially supported on said movable member and laterally aligned with said first wheel-engaging roller, said movable member being adapted to be slidably shifted to position its longitudinal axis slightly angularly relatively to the longitudinal axis of said stationary member, manually actuable means for alternately forcibly shifting opposite ends of said movable member to cause said rollers to engage and lift the wheel for support on the dolly by a wedging action of said rollers, manually releasable frictional means comprising a pair of serrated cams rotatably supported on the opposite ends of said movable member engageable with said rails for retaining said movable member in its wheel-lifted position, and resilient means operatively connected to said cams adapted to releasably maintain said cams in positions either frictionally engaged with or disengaged from said rails.

4. A wheel-lifting and transporting dolly comprising a movable frame including a pair of laterally spaced parallelly aligned rails transversely rigidly connected together at corresponding ends by a relatively stationary cylindrical wheel-lifting member, a first pair of wheel-engaging cylindrical rollers rotatably coaxially supported on said stationary member, a movable cylindrical wheel-lifting member slidably carried on said rails, a second pair of wheel-engaging cylindrical rollers rotatably coaxially supported on said movable member and laterally aligned with said first pair of wheel-engaging rollers, said movable member being adapted to be slidably shifted to position its longitudinal axis slightly angularly relatively to the longitudinal axis of said stationary member, manually actuable means for alternately forcibly shifting opposite ends of said movable member to cause said rollers to engage and lift the wheel for support on the dolly by a wedging action of cooperating pairs of said rollers, and manually releasably frictional means engageable with said rails for retaining said movable member in its wheel-lifted position.

References Cited in the file of this patent

UNITED STATES PATENTS

| | | |
|---|---|---|
| 1,248,896 | Olson | Dec. 4, 1917 |
| 2,170,607 | Green | Aug. 22, 1939 |
| 2,392,409 | Ray | Jan. 8, 1946 |
| 2,452,481 | Morehead et al. | Oct. 26, 1948 |
| 2,505,352 | Dillon | Apr. 25, 1950 |
| 2,695,718 | Epps | Nov. 30, 1954 |